United States Patent [19]

Smith

[11] 4,449,432
[45] May 22, 1984

[54] CUTOFF DEVICE FOR AUTOMATIC SCREW MACHINE

[75] Inventor: James R. Smith, Orchard Park, N.Y.

[73] Assignee: Curtis Screw Company, Inc., Buffalo, N.Y.

[21] Appl. No.: 304,025

[22] Filed: Sep. 21, 1981

[51] Int. Cl.³ .................... B23B 3/34; B23D 23/00
[52] U.S. Cl. ........................................... 82/3; 83/491
[58] Field of Search ............... 29/38 B, 57, 65; 82/3, 82/76, 46, 101; 83/491; 407/31, 120; 409/283

[56] References Cited

U.S. PATENT DOCUMENTS

| | | | |
|---|---|---|---|
| 824,347 | 6/1906 | Fletcher | 83/491 |
| 2,055,436 | 9/1936 | Gridley et al. | 29/38 B |
| 2,399,621 | 5/1946 | Bodmer | 29/57 |
| 3,453,912 | 6/1965 | Shafer | 82/47 |
| 3,505,530 | 9/1971 | Doty | 82/4 C |
| 3,596,545 | 8/1971 | Elsenhardt | 82/2.5 |
| 3,598,005 | 8/1971 | Shafer | 82/46 |
| 3,643,307 | 2/1972 | Ledergerber et al. | 82/3 |
| 3,685,111 | 8/1972 | Nemoto | 82/3 |
| 3,688,363 | 9/1972 | Thobroe | 82/3 |
| 3,732,760 | 5/1973 | Parks | 29/57 |
| 3,798,720 | 3/1974 | Ledergerber | 82/3 |
| 4,126,064 | 11/1978 | Tarrant | 82/1 C |
| 4,208,772 | 6/1980 | Earnhardt et al. | 82/3 |
| 4,270,419 | 6/1981 | Tomlinson | 82/3 |

FOREIGN PATENT DOCUMENTS 1360283 3/1964 France .................... 30/388

Primary Examiner—E. R. Kazenske
Assistant Examiner—Paul M. Heyrana, Sr.
Attorney, Agent, or Firm—Christel, Bean & Linihan

[57] ABSTRACT

A rotary saw cutoff device for use on an automatic screw machine without the need to sacrifice a working station to accommodate the device, and which is narrower than a standard cutoff tool to reduce the waste loss due to cutoff. The working area of the cutoff device presents a slender profile to permit the device to be movable into and out of the working area of the automatic screw machine without interfering with the other parts of the machine. The saw blade is positioned at the outer edge of a frame in which it is rotatably supported, and it is driven through a gear train by an hydraulic motor. A driven gear is drivingly connected to the saw blade and is supported in bearings, one of which is positioned in a recess formed in one face of the gear.

5 Claims, 12 Drawing Figures

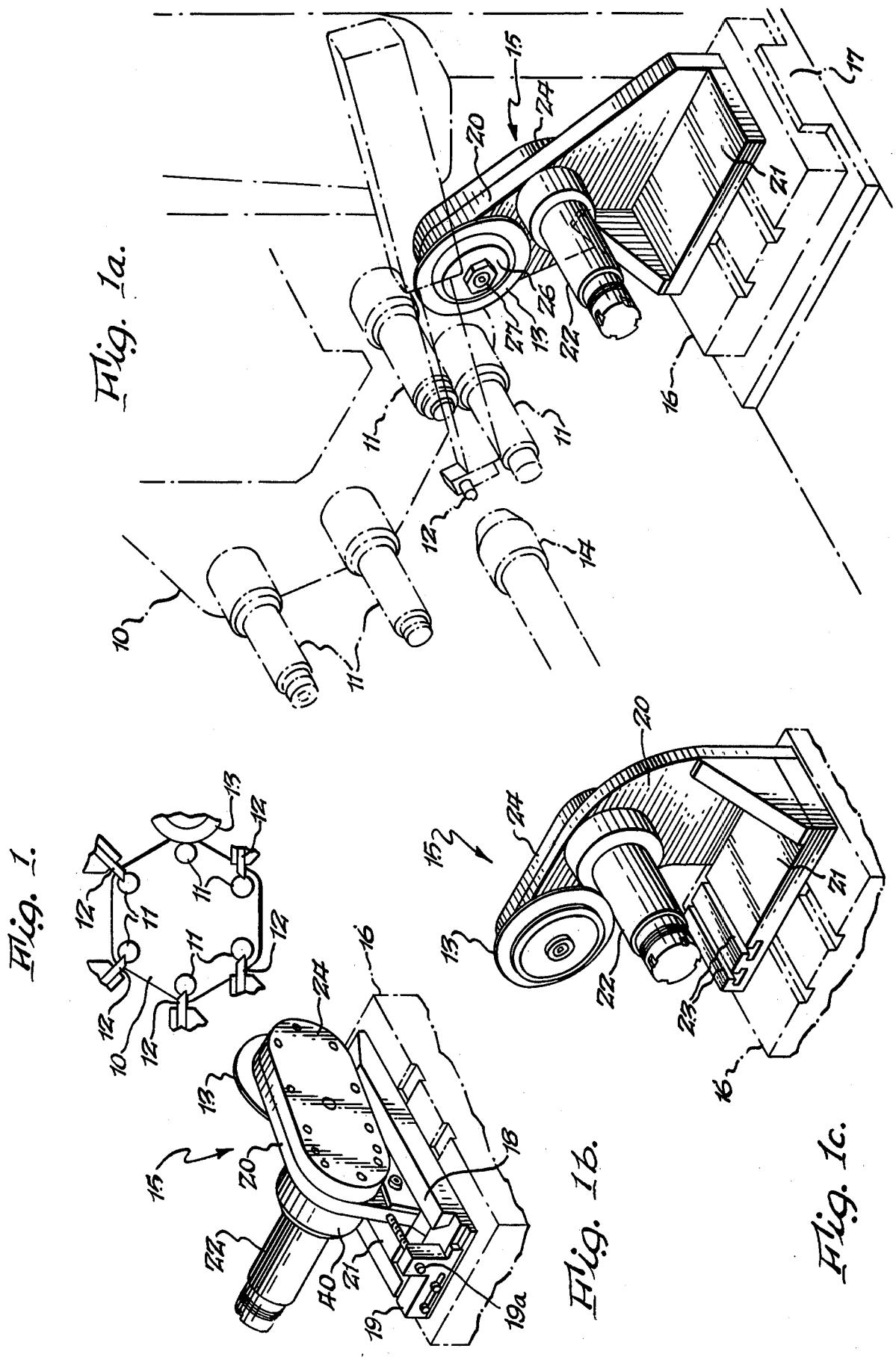

Fig. 4.
Fig. 2.
Fig. 3.
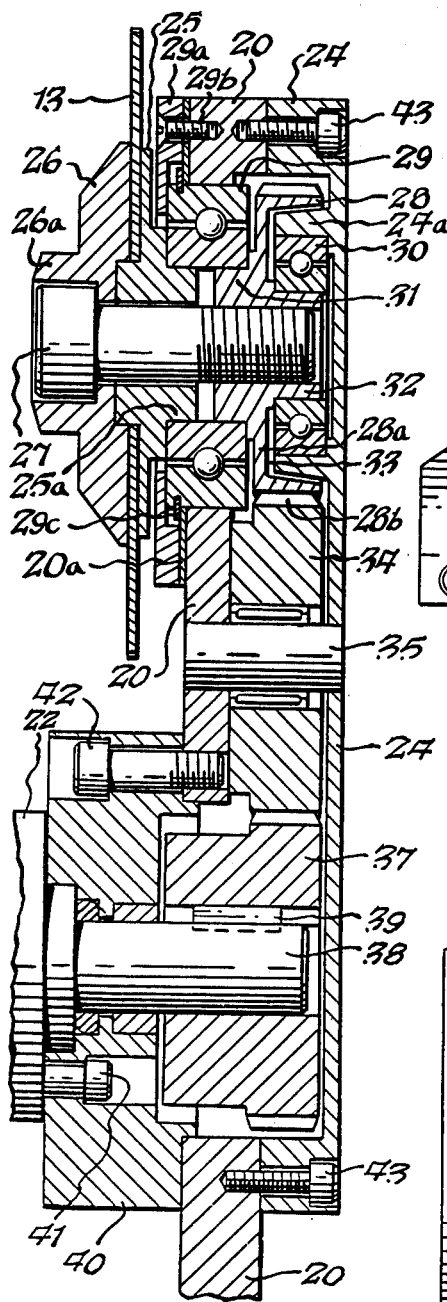
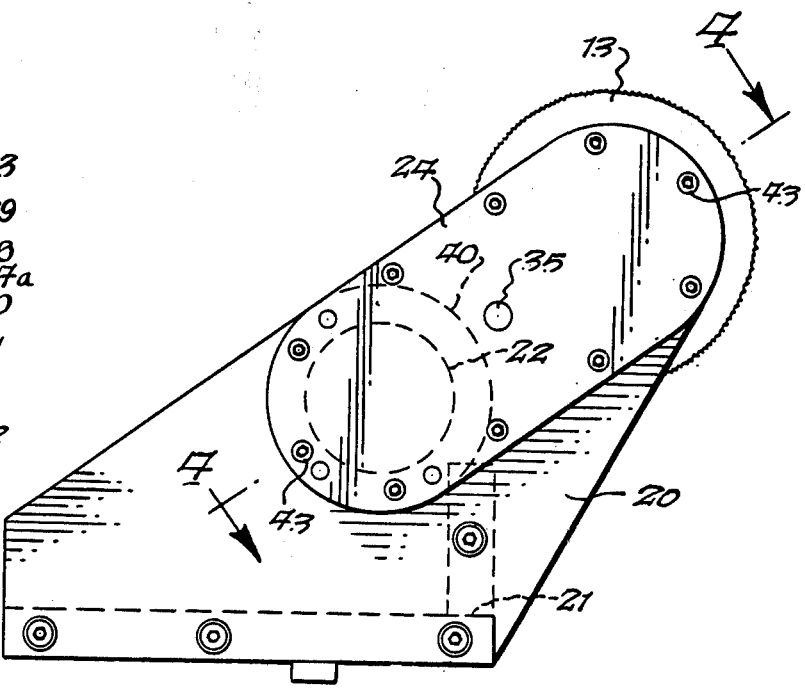
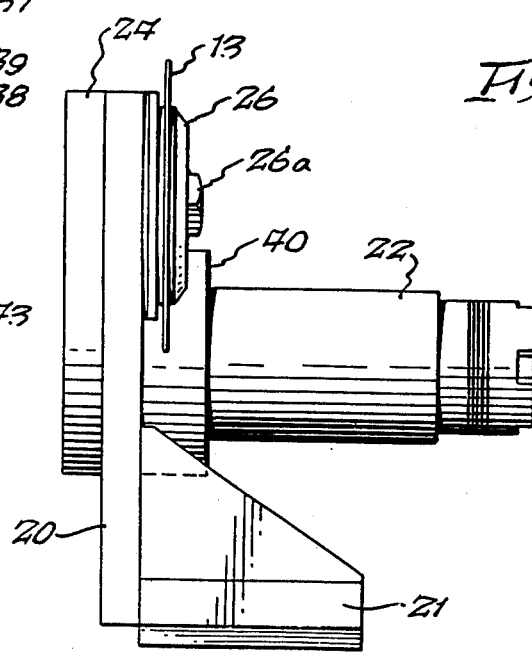

CUTOFF DEVICE FOR AUTOMATIC SCREW MACHINE

BACKGROUND OF THE INVENTION

This invention relates to a device for cutting from bar stock workpieces upon which several machining operations have been performed, and more particularly to a rotary saw cutoff device for use in the confined machining area of automatic screw machines and which does not interfere with or limit the number of work stations with which the machine was designed to be operable.

Automatic screw machines are complicated metal cutting machines designed to perform multiple turning operations on a plurality of workpieces simultaneously. Typically, such a machine involves a rotary stock holder which is adapted to hold several pieces of elongated bar stock and feed it in a predetermined fashion both rotationally from one work station to another and also axially, so that the several machining operations for which the machine was designed can be performed on the bar stock to form the desired parts. Opposed to the rotary bar stock-carrying structure and disposed on the opposite side of the machining area are a plurality of toolholding devices intended to hold such tools as cutters for conventional turning operations, screw thread cutters, drills, reamers, borers, and the like. The machine is intended to be capable of performing sequentially a series of turning, boring, drilling, reaming, or other typical such operations on a workpiece as the workpiece is rotated from one work station to another. Such machines commonly have six work stations and six bar stock holders, but they can have as many as sixteen work stations and bar stock holders or as few as two.

One of the necessary operations in such an automatic screw machine is the step of severing the machined workpiece from the remainder of the bar stock after a predetermined number of machining operations have been completed. In the past, such cutoffs were effected by stationary cutoff tools which were configured similar to a standard tool for turning except they typically had a width of from about 0.090 inches to about 0.125 inches. As a result, that width of material corresponding to the cutoff tool width became waste, and thus there was an impetus to provide cutting devices having thinner widths, which would result in less waste material and would thereby permit a greater number of parts to be made from a given length of bar stock. One such approach is described and illustrated in U.S. Pat. No. 3,598,005, which discloses the use of rotary saw blades of relatively narrow width, the saw blades therein disclosed having extremely narrow widths of 0.032 inches or less. Similarly, U.S. Pat. No. 3,596,545, shows an automatic lathe incorporating a rotary saw cutoff device, the machine there disclosed being capable of handling and operating upon only a single workpiece.

Despite the fact that the prior art discloses narrow width rotary saws as desired cutoff devices for parts made from bar stock in order to reduce waste material and thereby provide more parts per unit length of bar stock, the prior art devices are so configured that they are rather bulky, or they include driving arrangements which severly limit their applicability and virtually preclude their use on commonly utilized automatic screw machines unless space is made to accommodate their bulk. When such space is provided, it usually requires sacrificing a work station in order to permit the prior art devices to be attached to and utilized with the machine. Consequently, there is a need for a rotary cutoff saw arrangement which is significantly less bulky than the prior art devices and which can be utilized on existing automatic screw machines without modification of the machine itself or its parts, and without sacrificing the number of machining operations of which the machine is capable, in order that the machine can be utilized to its full design capacity.

BRIEF SUMMARY OF THE INVENTION

It is an object of the present invention to provide an improved rotary saw cutoff device which presents a slender profile so that it can be readily accommodated on existing automatic screw machines in the limited space which such machines normally offer.

It is another object of the present invention to provide a rotary saw cutoff device which in overall size is smaller than that of the prior art devices so that the entire device may be contained within the normal machining area of an automatic screw machine and without sacrificing a work station.

It is still another object of the present invention to provide a rotary saw cutoff device which can be utilized with a double deck toolholder to permit two separate and distinct operations to be performed from a single toolholding station upon two separate workpieces.

Briefly stated, in accordance with one aspect of the present invention, there is provided a rotary saw cutoff device which is intended for use in extremely confined spaces such as those encountered in the machining area of a multi-station, multi-operation, automatic screw machine. The device includes a base which is mounted on a table supported for reciprocating linear movement toward and away from a workpiece. Secured to the base is a frame which rotatably supports a circular saw blade positioned between a pair of supporting members to define a rotatable spindle supported in the frame. Drive means are provided to rotate the saw and bearing means are provided to reduce the rotational friction between the spindle and the frame.

BRIEF DESCRIPTION OF THE DRAWINGS

FIG. 1 is a fragmentary elevational view of the workpiece and tool arrangement in a six-station, six workpiece automatic screw machine.

FIG. 1a is a perspective view, partially broken away, showing a portion of the working area of an automatic screw machine including several workpieces and several toolholders, together with a rotary saw cutoff device in accordance with the present invention.

FIG. 1b is a perspective view of another embodiment of the present invention wherein the rotary saw device is mounted upon a double deck toolholder to provide an additional machining operation capability.

FIG. 1c is a perspective view similar to that of FIG. 1b and showing still another embodiment of the present invention wherein the rotary saw device is mounted on a base which will also support a toolholder to provide additional machining capacity.

FIG. 2 is a side view of the embodiment of the rotary saw cutoff device shown in FIG. 1a.

FIG. 3 is a front view of the embodiment of the rotary saw cutoff device shown in FIGS. 1a and 2 and illustrating the narrow profile of a cutoff device according to the present invention.

FIG. 4 is a fragmentary cross-sectional view taken along the line 4—4 of FIG. 2.

DESCRIPTION OF THE PREFERRED EMBODIMENTS

Figure 5:
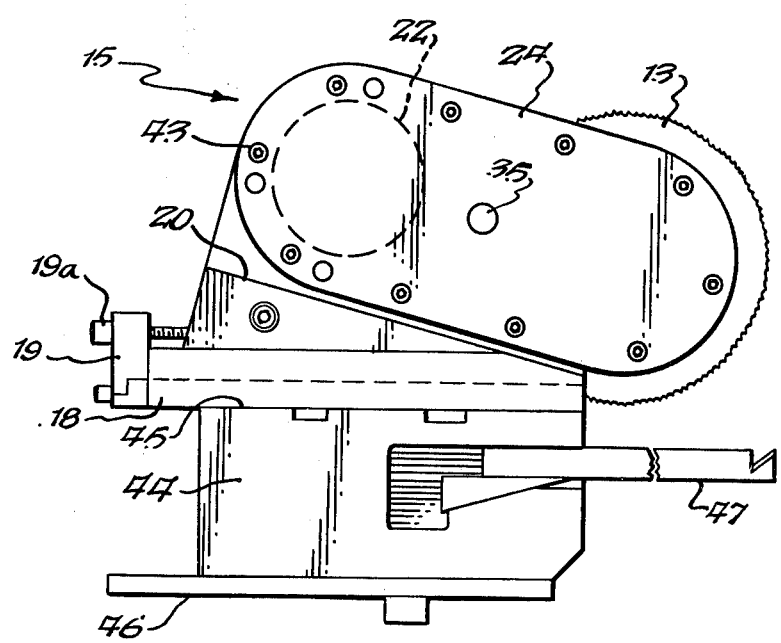
FIG. 5 is a side view of the embodiment of the rotary saw cutoff device shown in FIG. 1b and illustrating the dual capability of that embodiment.

Referring now to the drawings, and particularly to FIG. 1 thereof, there is shown a portion of the working area of an automatic screw machine 10 wherein a plurality of metal turning operations are simultaneously performed upon a plurality of workpieces 11 in a predetermined sequence, by a plurality of cutting tools 12. A six station machine is shown with the workpieces arranged in a hexagonal pattern. After a particular machining operation is completed on each of the workpieces, the hexagonal pattern rotates in a clockwise direction so that each workpiece is advanced to the next work station for the next operation to be performed. The initial operation is performed at the lower right work station and the final operation at the extreme right work station. As shown, the cutoff operation is effected by rotary saw blade 13.

Referring now to FIG. 1a, there is shown, in perspective, a portion of the working area of the machine with only four workpieces 11 visible, only one cutting tool 12 visible, rotary saw blade 13, a workpiece receiving collet 14, and saw blade holder 15, the remainder of the machine and workpieces having not been shown for purposes of clarity of illustration. Workpieces 11 are the forward ends of a piece of bar stock, and when the finished workpieces are severed from the bar stock by rotary saw blade 13 the bar stock is advanced axially into the working area of the machine, in a manner known to those skilled in the art, to present a new workpiece at that particular station. Except for rotary saw blade holder 15 and its associated supporting structure, the other elements shown in FIG. 1a are in phantom to illustrate a portion of the narrow and congested environment in which rotary saw blade 13 is required to operate.

Although omitted from FIG. 1a, it should be appreciated that there are two additional workpiece-holding stations, together with five cutting tools, all of which are contained within a small area. The workpiece-holding stations are adapted to rotate in a clockwise direction as viewed in FIG. 1a from one working station, whereupon an operation is performed thereon, and then, successively, to the remaining stations, in sequence and to remain in each position for the required times to perform the respective operations, until all the operations have been completed. The tools which can be employed include drills, reamers, and other internal and external cutting tools. The cutting tools are individually controlled to come into contact with the respective workpieces in a controlled feed fashion to perform the particular operation involved. Thus it can be seen that the working area of the machine is quite congested in that it includes six individual workpieces and six individual cutting tools, each of which is operating simultaneously, thereby providing very little space for any auxiliary operations and their associated driving means.

Illustrated in FIG. 1a is one form of rotary saw blade holder 15 in accordance with the present invention. The device shown is adapted to be secured to a table 16, which is positioned on a machine slide 17, which permits transverse movement of table 16 with respect to the axes of the several workpieces and of the several tool stations. Table 16 can be reciprocated to carry saw blade holder 15 into and out of working position by means of a conventional rotary cylindrical cam and roller arrangement, or by a drive screw, to permit feeding of saw blade 13 at the proper time to cut workpiece 11 from the bar stock after the workpiece has been grasped by collet 14. As shown, the forward, working end of saw blade holder 15 is of a very narrow width to permit it to enter the very restricted space in the working area of the machine between the cutting tools and the workpieces.

Saw blade holder 15 includes a rotary saw blade 13, which is secured to a drive shaft, the axis of the drive shaft being arranged to be generally parallel to the axes of the several workpieces. The drive shaft is rotatably supported on a frame 20 which, in turn, rests upon a base 21 secured to table 16. Also attached to frame 20 is a hydraulic motor 22 which is connected to a source of hydraulic fluid under pressure to cause the motor to rotate, and which, through a gear train to be hereinafter described, provides a direct drive to the blade 13.

FIGS. 1b and 1c show alternative embodiments of the saw blade holder of the present invention, each of which includes a differently configured frame 20 to conform with the space and position limitations of certain types and sizes of screw machines. The embodiment of FIG. 1b involves different relative positions for saw blade 13 and motor 22 and includes means to adjust the position of saw blade holder 15 by forming the lateral edges of base 21 at an angle so that it is slidably carried in dovetail holder 18, which includes a rear stop 19 to threadedly receive and carry an adjustable stop screw 19a, which bears against the rear-most edge of frame 20 to permit saw blade holder 15 to be returned to a predetermined position relative to table 16 and dovetail holder 18.

In the embodiment of FIG. 1c, saw blade 13 and motor 22 are oriented in still a different relative arrangement and base 21 is different to the extent that it extends forwardly toward the working area of the machine and includes a pair of T-slots 23 to support another toolholder, if desired.

Referring now to FIGS. 2, 3, and 4, which show several views of the embodiment of the invention shown in working position in FIG. 1a, there is shown saw blade 13, which preferably has a width of about 0.040 inches in order to provide the reduced cutoff loss which is contemplated by the present invention. Saw blade 13 can be made from high speed steel or carbide for long life and can be satisfactorily operated at a rotational speed of the order of about 700–1000 rpm, although it can also be operated at other speeds, if desired. An example of a saw blade which has been found to be suitable in connection with the present invention is one having a diameter of 4 inches, 120 teeth, and which is hollow ground so that it is thicker at the teeth than at its hub. A suitable range for the saw blade diameter is from 2.5 to 6 inches and that for the number of teeth is from 50-150, depending upon the particular workpiece material. Saw blade 13 is driven by motor 22 through a gear train which is housed between frame 20 and a bolted cover 24.

As shown in FIG. 4, which is a cross-sectional view showing the internal arrangement of the saw drive train, saw blade 13 is held against a flange member 25 by a mounting flange nut 26 which includes a hex head 26a, and a cap screw 27 threadedly secured to an internal thread carried by a gear 28. Gear 28 is supported for rotation relative to frame 20 and cover 24 by means of a pair of inner and outer ball bearings 29, 30, respectively. Inner bearing 29 is positioned on the side of gear 28 adjacent saw blade 13 and is supported on an inwardly extending annular flange 31 formed on the hub of gear 28 and another flange 25a formed of member 25. Outer bearing 30 is positioned adjacent to a coaxial, outwardly extending annular flange 32 formed on the hub of the gear 28 and defined by an annular recess 33 formed in the outer face of gear 28, the purpose of which is to reduce the axial length of the entire assembly. In this connection it should be observed that the gear 28 has a relatively narrow portion 28a which extends from the gear hub to the gear teeth 28b. The outer race of bearing 30 is supported by a milled boss 24a in the cover. The various parts, namely screw 27, flanges 26 and 25, saw 13, gear 28 and inner races of bearings 29 and 30 all rotate together as a common unit, which unit is held within the frame 20 by a retainer 29a held to the frame in any suitable manner, such as by fasteners 29b. The outer race of bearing 29 is provided with a groove which receives ring 29c which bears against spacer or shim 20a thereby properly locating the rotatable assembly with respect to frame 20. Drivingly connected to gear 28 is an idler gear 34 supported on a stationary central shaft 35, which extends between and which is supported in frame 20 and cover 24. As shown, idler gear 34 is supported on a needle bearing 36 to minimize friction. Drivingly engaging with idler gear 34 is a drive gear 37, which also is housed between frame 20 and cover 24 and which is secured to the drive shaft 38 of hydraulic motor 22 as by means of a key 39. Motor 22 is secured to a motor mount 40 as by means of cap screws 41, and mount 40 is, in turn, secured to the opposite side of frame 20 from that to which cover 24 is secured by means of cap screws 42. Each of gears 28, 34, and 37 utilized in the drive train is of the same diameter and carries the same number of teeth in order to provide a direct 1:1 drive relationship between motor 22 and saw blade 13. If desired, however, other gear ratios could be employed to permit a rotary saw cutoff operation to be performed without sacrificing a work station.

Cover 24 is secured to frame 20 by means of cap screws 43 to enclose a gear train and to protect it from damage and wear due to metal chips resulting from the cutting or sawing operations. If desired, lubrication can be provided by the continuous supply to the gear train of oil from the screw machine's lubrication system.

Figure 6:
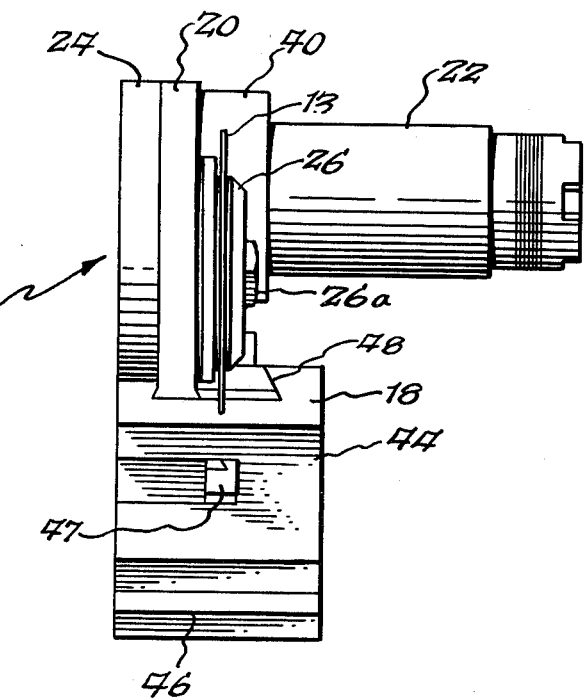
FIG. 6 is a front view of the embodiment illustrated in FIGS. 1b and 5.

In FIGS. 5 and 6 there is shown an alternative embodiment of the invention, like that shown in FIG. 1b, involving a differently configured frame 20 of smaller size and a different angular relationship between a line connecting the axes of the several gears and the horizontal plane. This particular embodiment contemplates a vertically shorter frame member in order to permit the cutoff device to be secured to a double-deck toolholder 44, the upper surface 45 of which provides means for securing saw blade holder 15 in position, and the lower surface 46 of which is secured to table 16 shown in FIG. 1b. In this particular embodiment, toolholder 44 provides an additional tooling position to permit a cutting tool 47 to perform a cutting operation on one workpiece while another workpiece is being severed from the bar stock by saw blade 13. Thus, instead of sacrificing a work station, as would be the case with the prior art rotary saw cutoff devices, this particular embodiment includes an additional work station beyond the cutoff device itself. As shown in FIGS. 5 and 6, the relative position between saw blade 13 and tool 47 can be altered because saw blade holder 15 is mounted in a dovetail slot 48 provided in the upper surface of dovetail base 18 to permit saw blade holder 15 to be slidably positioned in proper orientation relative both to a workpiece (not shown) and to cutting tool 47. As shown in FIG. 5, a positioning stop 19, can be provided with an adjustable stop screw 19a to position saw blade holder 15 for the desired depth of cut and to permit repositioning of saw blade holder 15 in the desired position if for some reason it has been removed from dovetail slot 48.

Figure 7:
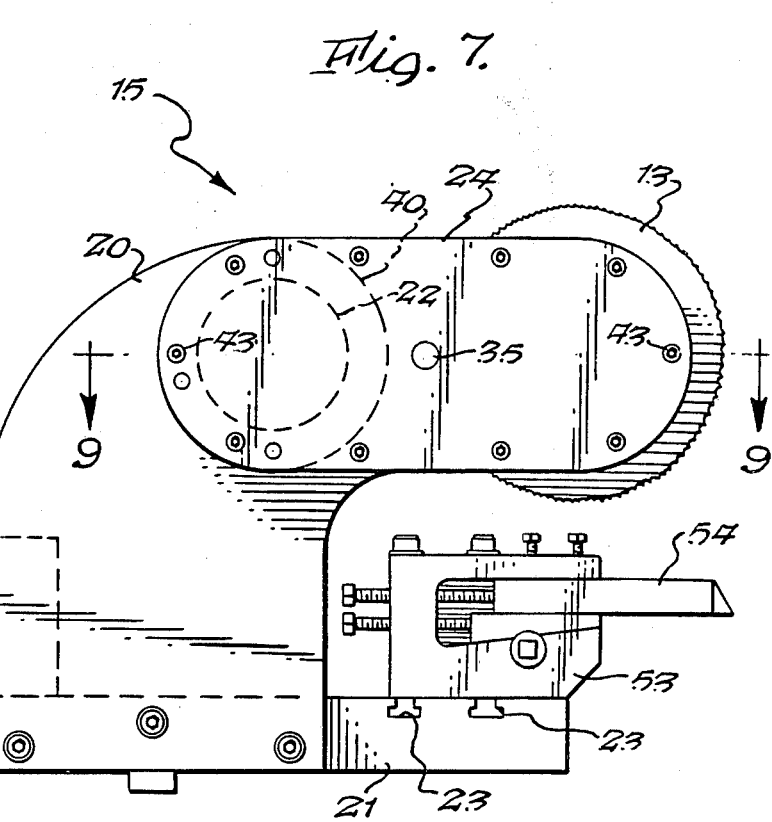
FIG. 7 is a side view of the embodiment of the rotary saw cutoff device shown in FIG. 1c.
Figure 8:
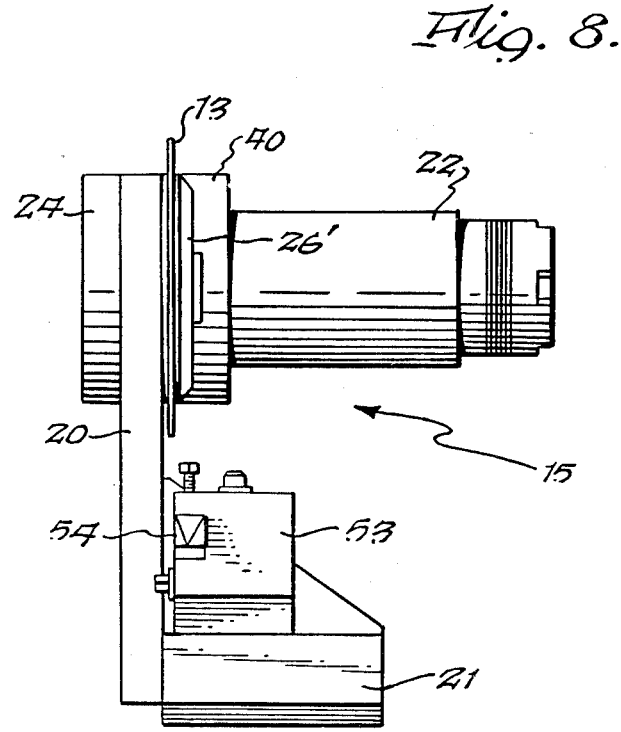
FIG. 8 is a front view of the embodiment illustrated in FIGS. 1c and 7.
Figure 9:
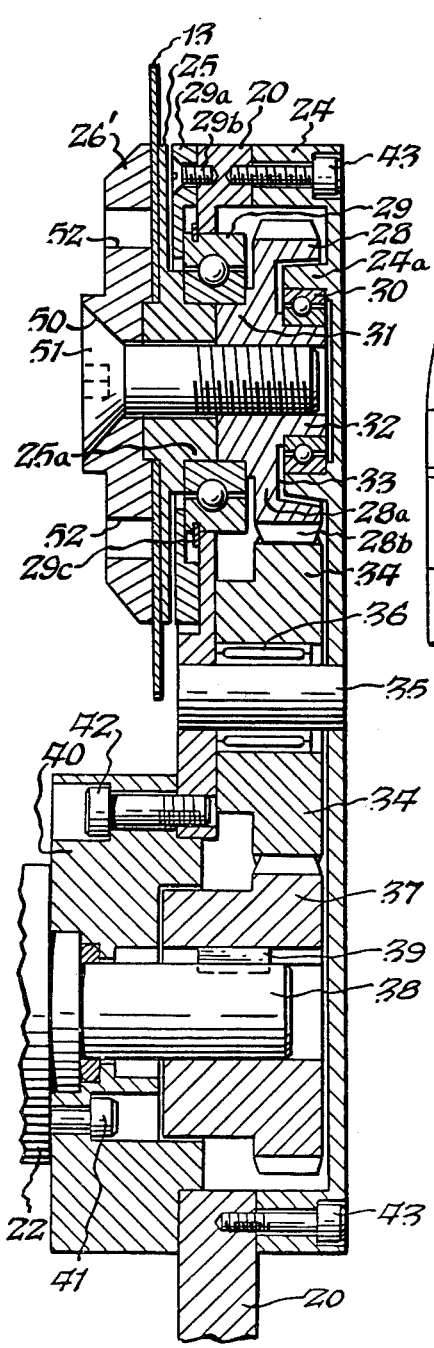
FIG. 9 is a fragmentary cross-sectional view taken along the line 9—9 of FIG. 7.

Illustrated in FIGS. 7, 8, and 9 is a further embodiment of the invention like that shown in FIG. 1c, one wherein the gears are arranged so that their axes define a line which is substantially parallel with the horizontal. Again, motor 22 and saw blade holder 15 are generally constructed as have previously been described, one of the principal differences in this embodiment involving a saw blade mounting arrangement which further reduces the axial width of the device at the point where saw blade 13 is attached thereto. As shown in this particular embodiment, mounting flange nut 26' does not include a hex head as in the embodiment shown in FIG. 4, but merely includes a countersunk central portion 50 to receive a tapered head bolt 51, which is threadedly secured to gear 28 in a manner similar to that of cap screw 27 shown in FIG. 4. During the installation of saw blade 13, flange 26' is held stationary by means of a spanner (not shown) having a pair of spaced lugs which fit into a pair of axial apertures 52. Bolt 51 is then threadedly engaged with gear 28 to secure the assembly. Additionally, this embodiment incorporates a base 21 including T-slots 23, which provide means to attach and secure toolholder 53, which, in turn, supports cutting tool 54, to again provide an additional work station.

From the foregoing, it will be apparent that the present invention permits the utilization in close quarters in an automatic screw machine of an additional tool for cutting the shaped workpiece from the bar stock without sacrificing a cutting station. The narrow width of the cutting saw forming part of the tool, and its associated structure, permits it to be introduced into the working area of the machine without impeding the operation of the work-rotating system or of the other cutting tools. It thus is adaptable to a considerably wider range of automatic screw machines then are the prior art devices.

While particular embodiments of the invention have been illustrated and described, it will be apparent to those skilled in the art that various changes and modifications can be made without departing from the spirit and scope of the invention, and it is intended to encompass within the appended claims all such changes and modifications that fall within the scope of the present invention.

What is claimed is:

1. A rotary saw cutoff device for cutting workpieces, said device being usable with an automatic screw machine wherein a plurality of metal cutting operations are performed on bar stock sections which are advanced in a circular path to a plurality of work stations for sequential presentation to a plurality of cutting tools; said cut-off device comprising:

a base (21) positionable on a machine slide (17) for transverse movement towards and away from the bar stock;

an upstanding frame (20) which extends generally transversely to the axis of said circular path and having spaced apart first and second portions, the first portion being supported by said base (21) and the second portion being disposed adjacent said circular path;

rotatable means (27, 26, 15, 13 and 28) extending through the second portion of said frame (20) and including a rotatable saw (13) secured thereto and mounted on one side of said frame (20) and a driven element (28) disposed on the other side of said frame;

drive means including a motor (22) secured to said one side of said frame (20) between the first and second portions of said frame and a drive element (37) rotatably driven by said motor (22) and disposed on said other side of said frame (20), said drive element (37) being inerconnected with said driven element (28) for driving the same;

a cover (24) secured to said other side of said frame (20) and enclosing said drive and driven elements (37, 28); and bearing means (30, 29) disposed within said frame (20) and cover (24) for rotatably journaling said rotatable means.

2. The rotary saw cutoff device as set forth in claim 1 wherein the motor is a hydraulic motor.

3. The rotary saw cutoff device as set forth in claim 1 wherein the driven element includes a gear having a relatively narrow web portion, and said bearing means including first and second ball bearings disposed closely adjacent said web portion.

4. The rotary saw cutoff device as set forth in claim 3 wherein said cover includes a milled boss portion which receives said first ball bearing, the outer race being supported by the milled portion and the inner race being supported by said driven gear.

5. The rotary saw cutoff device as set forth in claim 3 wherein the rotatable means includes a flange member disposed between said saw and said frame, the inner race of said second bearing being supported by said flange member and said driven gear.

* * * * *